(12) United States Patent
Herlocker et al.

(10) Patent No.: US 8,706,748 B2
(45) Date of Patent: Apr. 22, 2014

(54) METHODS FOR ENHANCING DIGITAL SEARCH QUERY TECHNIQUES BASED ON TASK-ORIENTED USER ACTIVITY

(75) Inventors: Jonathan L. Herlocker, Seattle, WA (US); Thomas G. Dietterich, Corvallis, OR (US); John B. Forbes, Seattle, WA (US); Paul Maritz, Mercer Island, WA (US)

(73) Assignee: DECHO Corporation, Pleasant Grove, UT (US)

( * ) Notice: Subject to any disclaimer, the term of this patent is extended or adjusted under 35 U.S.C. 154(b) by 733 days.

(21) Appl. No.: 12/001,987

(22) Filed: Dec. 12, 2007

(65) Prior Publication Data

US 2009/0157617 A1   Jun. 18, 2009

(51) Int. Cl.
*G06F 7/00* (2006.01)
*G06F 17/30* (2006.01)

(52) U.S. Cl.
CPC .... *G06F 17/30427* (2013.01); *G06F 17/30463* (2013.01)
USPC ............................. 707/760; 707/759; 707/765

(58) Field of Classification Search
CPC ...................... G06F 17/30427; G06F 17/30463
USPC ......... 707/759, 760, 765, 732, 705, 723, 736, 707/749
See application file for complete search history.

(56) References Cited

U.S. PATENT DOCUMENTS

| | | | |
|---|---|---|---|
| 5,640,553 A * | 6/1997 | Schultz | 707/5 |
| 6,101,492 A * | 8/2000 | Jacquemin et al. | 707/688 |
| 6,327,590 B1 | 12/2001 | Chidlovskii et al. | |
| 6,684,195 B1 | 1/2004 | Deaton et al. | |
| 6,775,376 B2 | 8/2004 | Hsieh et al. | |
| 7,069,229 B1 * | 6/2006 | Richardson et al. | 705/7.15 |
| 7,225,187 B2 | 5/2007 | Dumais et al. | |
| 7,392,252 B2 | 6/2008 | Tsukada et al. | |
| 7,448,022 B1 | 11/2008 | Ram et al. | |
| 7,548,915 B2 | 6/2009 | Ramer et al. | |
| 7,565,363 B2 | 7/2009 | Anwar | |
| 7,617,198 B2 | 11/2009 | Durvasula | |
| 7,653,702 B2 | 1/2010 | Miner | |
| 7,664,734 B2 | 2/2010 | Lawrence et al. | |
| 7,676,452 B2 | 3/2010 | Doganata et al. | |
| 7,765,173 B2 * | 7/2010 | Singh et al. | 706/12 |
| 7,822,699 B2 * | 10/2010 | Katariya et al. | 706/45 |
| 8,108,796 B2 * | 1/2012 | Jobling et al. | 715/816 |

(Continued)

OTHER PUBLICATIONS

Voida, Stephen et al., "Integrating Virtual and Physical Context to Support Knowledge Workers," IEEE Pervasive Computing, vol. 1, No. 3, 2002, 9 pp.

(Continued)

*Primary Examiner* — Cheyne D Ly
(74) *Attorney, Agent, or Firm* — Muirhead and Saturnelli, LLC

(57) ABSTRACT

Methods for using task-related information to enhance digital searching are provided. A task-oriented user activity system maintains task-related information about resources accessed by a user and current user task. This task-related information is used to enhance search queries to include task-related search criteria that improve relevance of search results. The task-related information can also be used to include task-related metadata in search engine index, e.g., by storing the metadata in the index or by storing it in resources which are subsequently indexed. Task-related information can also be used to enhance search results by filtering and ranking results to increase relevance with respect to a user's current task.

20 Claims, 8 Drawing Sheets

(56) References Cited

U.S. PATENT DOCUMENTS

| | | |
|---|---|---|
| 2003/0033370 A1 | 2/2003 | Trotta |
| 2003/0037041 A1 | 2/2003 | Hertz |
| 2003/0045958 A1* | 3/2003 | Brandt et al. ............... 700/101 |
| 2003/0130995 A1 | 7/2003 | Pope et al. |
| 2003/0131013 A1 | 7/2003 | Pope et al. |
| 2003/0131016 A1 | 7/2003 | Tanny et al. |
| 2003/0158855 A1 | 8/2003 | Farnham et al. |
| 2004/0138936 A1* | 7/2004 | Johnson et al. ................ 705/7 |
| 2004/0153436 A1 | 8/2004 | Pope et al. |
| 2004/0249821 A1 | 12/2004 | Nies et al. |
| 2005/0114785 A1* | 5/2005 | Finnigan et al. ............ 715/762 |
| 2005/0267770 A1* | 12/2005 | Banavar et al. ................ 705/1 |
| 2006/0026189 A1* | 2/2006 | Djugash et al. ............. 707/102 |
| 2006/0036565 A1 | 2/2006 | Bruecken |
| 2006/0136391 A1 | 6/2006 | Morris |
| 2006/0136393 A1 | 6/2006 | Abbott et al. |
| 2006/0235873 A1 | 10/2006 | Thomas |
| 2007/0060099 A1 | 3/2007 | Ramer et al. |
| 2007/0124263 A1* | 5/2007 | Katariya et al. ............... 706/14 |
| 2007/0162907 A1* | 7/2007 | Herlocker et al. ............ 718/100 |
| 2007/0244924 A1 | 10/2007 | Sadovsky et al. |
| 2008/0140679 A1 | 6/2008 | Deyo et al. |
| 2008/0177726 A1* | 7/2008 | Forbes et al. .................... 707/5 |
| 2008/0243787 A1 | 10/2008 | Stading |
| 2009/0119278 A1 | 5/2009 | Cross et al. |
| 2009/0157653 A1 | 6/2009 | Herlocker et al. |
| 2009/0157729 A1 | 6/2009 | Herlocker et al. |

OTHER PUBLICATIONS

Kaptelinin, Victor, "UMEA: Translating Interaction Histories into Project Contexts," Paper: Integrating Tools and Tasks, vol. 5, Issue 1, 2003, pp. 353-360.

Fenstermacher, Kurt D. et al., "A Lightweight Framework for Cross-Application User Monitoring," IEEE Computer Society, 2002, pp. 51-59.

Kaminka, Gal A. et al., "Infrastructure for Tracking Users in Open Collaborative Applications: A Preliminary Report," The Maverick Group, Computer Science Dept., Bar Ilan University, Israel, 2003, 10 pp.

* cited by examiner

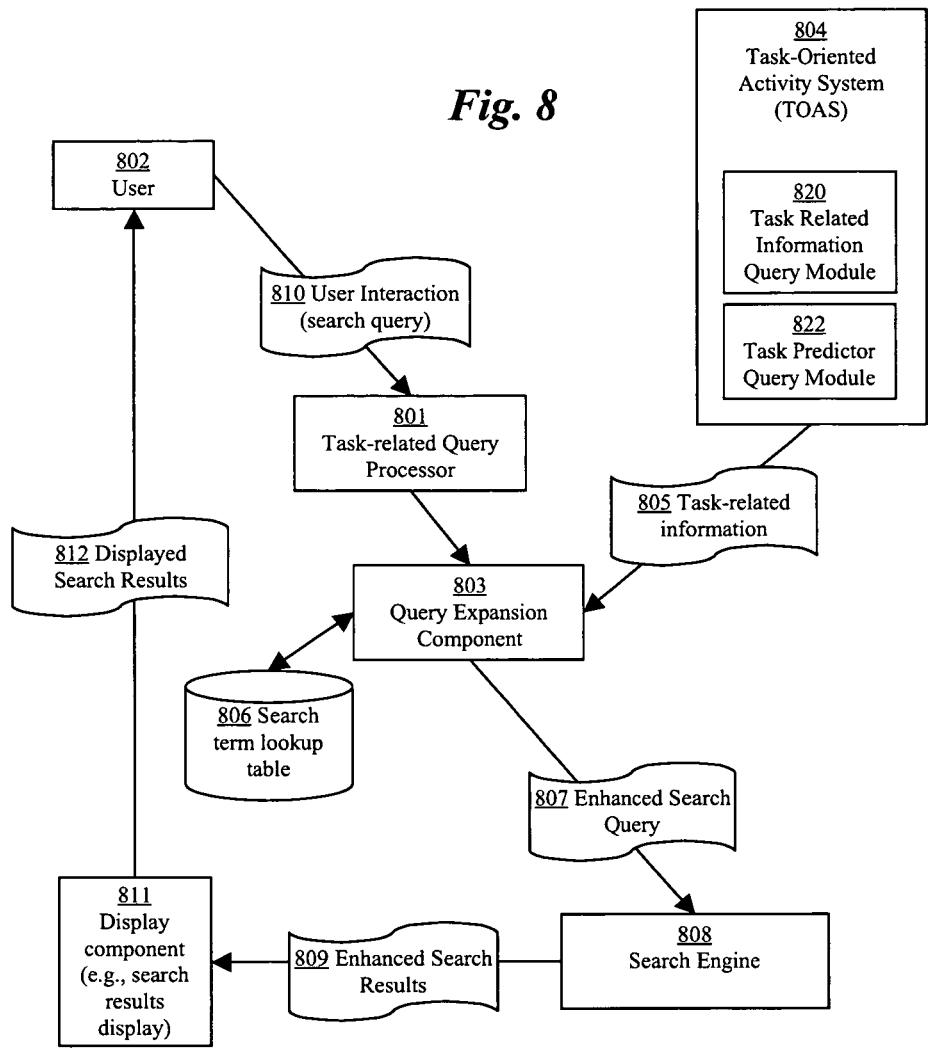

METHODS FOR ENHANCING DIGITAL SEARCH QUERY TECHNIQUES BASED ON TASK-ORIENTED USER ACTIVITY

FIELD OF THE INVENTION

The present invention relates generally to enhancing digital search techniques for computer users. More specifically, it relates to computer-implemented methods for enhancing search queries with task-related information for a computer user while the user is performing a task.

BACKGROUND OF THE INVENTION

The amount of information within a person's reach—either stored locally on their computer devices (desktop computer, handheld, mobile phone, etc.) or available to them via networks that their personal hardware is connected to—continues to increase. Locating the right information at the right time continues to be a challenging and frustrating problem for computer users. While the development of search engines has significantly increased the ability of computer users to discover or locate information, existing search engine technology still has various significant limitations, and it is frequently insufficient to help people locate the information they need.

Existing search engine technology works well in a narrow set of situations, such as when the user is able to provide search terms that precisely match the resources they are attempting to locate. As the number of resources that can be accessed and searched by computer users increases, however, the probability of being able to uniquely identify a resource via keyword terms decreases. Although link popularity metrics are very effective when one is looking for a popular resource on the internet, they are less useful when popularity is not a desired metric, and they fail almost completely for personal resources stored on a desktop computer or private network, where the resources are not generally hyperlinked. Thus, current desktop search algorithms in particular are generally only successful when the personal computer being searched has limited amounts of information, or when the user is able to come up with specific keyword terms that return a small number of search results.

Technologies exist to provide search results focused on a user's immediate context. Some search engine technologies use techniques to improve search results provided to a user based on personal information or preferences stored in a user profile. For example, U.S. Pat. No. 6,327,590 discloses a technique for determining a context of a search query based on a comparison of keyword terms with a user context profile. The search results are ranked based on the determined context for the search. In another example, U.S. Pat. No. 7,225,187 discloses methods for performing automated background search queries based on the ongoing activities of users, e.g., current application use. However, these technologies are limited in the amount of value that can be provided to the user. The limitations arise from two sources. First, in most cases the contexts are implicitly discovered and defined and do not match the user's own perception of their context. In other words, there are many "correct" ways to organize activity into contexts, and implicitly discovered contexts never completely match each individual's organization of their own activity into contexts. Thus search results presented to the user that the system believes to match the user's current context will not actually match the user's own perception of their current context. Second, most systems represent search contexts as keyword profiles or probability distributions across keywords. Such approaches have limited expressiveness, leading to either search results that are less specific (and thus less useful) then the non-contextualized search results, or lack of search results because the search is over-constrained.

US patent application publication 20070162907 entitled "Methods for Assisting Computer Users Performing Multiple Tasks," which is incorporated herein by reference, describes techniques for assisting and improving the productivity of computer users and relates specifically to computer-implemented methods for assisting users who switch between multiple tasks in a computing environment (FIG. 1). The method includes collecting from multiple executing programs event records that represent state changes in the programs. The event records may be collected, for example, by monitoring state changes in the multiple programs, selecting a subset of the monitored state changes, and generating event records representing this selected subset. The state changes in the programs may result from user interaction, automated processes, network communications, or other interactions between the programs and the computing environment. User interaction, for example, may include various forms of input received from the user, either locally or remotely, such as input resulting from user interaction with various programs or from direct user feedback, e.g., correcting predicted associations between tasks and resources. The method also includes receiving from the user a specification of a task being performed by the user, e.g., when a user switches tasks and elects to explicitly specify the task. The user may also specify metadata associated with the task, e.g., information about relationships between tasks or an indication of completion of a task.

Also included in the method is predicting a current task being performed by the user, e.g., applying machine learning algorithms to predict a most probable current task from stored evidence such as past associations between events and tasks. The current task may be predicted based on evidence including: i) a most recent event record, ii) a most recent specification received from the user of a task being performed by the user, and iii) past event records and associated task identifiers stored in a database. Other evidence may also be included such as time since the user last specified a task, past indications of completed tasks, tasks or keywords associated with resources related to the latest event, and explicit associations by the user between tasks and resources. Based on the predicted current task, user interface elements in multiple executing programs are automatically adapted to facilitate performing the current task. For example, the adaptation may include displaying a resource list (such as folders or directories) that contains resources associated with the predicted current task or that contains a menu of recently used resources filtered to favor resources associated with the predicted current task. The adaptation may also include displaying the predicted current task, e.g., in a menu bar of a window.

SUMMARY OF THE INVENTION

The invention provides various methods of using task-related information in the search process so that the results of search are more relevant to the user's current information needs. These methods include processing the user's search query to include task-related search criteria prior to sending the query to a search engine, and/or processing the search query to include task-related search criteria after submission to the search engine. These methods may be advantageously combined with various other task-enhanced search techniques such as, for example, post-processing results returned by existing search engines and augmenting the metadata indexes of existing metadata aware search engines to include task-related metadata to provide task-aware search engines.

In one aspect of the invention, a method is provided that allows the extension of search engine query languages to support task-oriented queries. In this method, components are added to the traditional search engine query processor to select subsets of search results based on task-oriented metadata, e.g., limit the results to documents likely to be associated with a specified task. The task-oriented extensions to the query language allow the user to put limitations on the query including (but not limited to):

Task. The task(s) that a resource is associated with (or is likely to be associated with)

Time of access. The time when a resource was {created, last accessed, last modified} by the user (in general, while the user was on the current task or on a specified task)

Frequency of use. How frequently the user has used an item (in general, while the user was on the current task or on a specified task)

Dataflow: limit to items that were the targets/sources of dataflows from/to one or more specified items Pattern of access. That a resource was accessed within a window of time—before, after, or either—with respect to another resource.

In some cases, it may not be practical to add a new component within an existing search engine or to influence the indexing, for example if the search engine and its indexing methods are proprietary and nonpublic. Accordingly, another aspect of the invention provides a method for transforming user-supplied search queries before they are submitted to the search engine. The user's query is first submitted to a query expansion component that interacts with a Task-Oriented Activity System (TOAS). The TOAS maintains a database categorized by task of past activity of the person initiating searches (the user)—where tasks are units of work that are meaningful to the user. The TOAS determines the most probable task that the user is working on at the moment a search query is issued. The query expansion component interacts with the TOAS to determine a current task and generates a set of additional keywords and modifiers to add to the user's query so that the results are more focused towards what the user is likely looking for at the moment that the query is submitted. The transformed query is then forwarded to the search engine.

These task-enhanced search query methods may advantageously be used in combination with various other task-enhanced search techniques. For example, the methods may be used with a technique for enhancing search results provided by a search engine based on information from the TOAS. After the search results are received from the search engine, they are filtered and ranked according to the likelihood that they are associated with the user's most probable tasks, as determined by the TOAS. In another example, the methods are combined with a technique that integrates the Task Oriented Activity System (TOAS) with the indexing component of a search engine that can query the TOAS and can either augment the standard index data structure with task related information or create separate task-oriented indices. By making use of an index containing such task-related information, a standard search engine becomes a task-aware search engine in which the new indices allow the search query and ranking engines to quickly and efficiently identify items that are likely to be relevant to a single task or a collection of tasks.

BRIEF DESCRIPTION OF THE DRAWINGS

FIG. 8 is a block diagram illustrating a system and method in which a search engine automatically expands a task-related search query using task-related information and forwards an enhanced search query to a search engine.

DETAILED DESCRIPTION

Although the present invention may be implemented on various computer devices running any of several operating systems and application programs, the following description may make reference to specific software applications, operating systems, and tasks for the purposes of illustration. Those skilled in the art will recognize that the present invention is not limited to these particularities.

DEFINITIONS

The following definitions will be used in the context of the present description:

Resources. Resources include logically grouped collections of stored information. Common examples of resources include documents, files, folders, web pages, email messages and saved search queries. Resources also include named entities or processes that the user can send information to or receive information from via the computer interface. Examples include people (contacts) and mailing lists. Resources may also be applications or database servers. Examples may include calendaring software applications, workflow applications, and financial tracking applications where knowledge of sub-collections of information within those applications is not made available to the invention (e.g., the instrumentation of the financial application may only be able to generate events when the application is accessed).

Search Engine. A search engine is an information retrieval system designed to help find resources stored on one or more computer systems, such as on the World Wide Web, inside a corporate or proprietary network, or on a personal computer. The search engine accepts queries for content meeting specific criteria (typically those containing a given word or phrase) and retrieves a list of items that match those criteria. This list is often sorted with respect to some measure of estimated relevance of the results. Search engines typically use regularly updated indexes to operate quickly and efficiently.

Indexer. An indexer is a software component that preprocesses resources and generates an index which may be used by a search engine for efficient search at a later time.

File Metadata. File metadata is data associated with a file which contains descriptive information to categorize the file or otherwise distinguish it from other files.

Search Query. A text string that specifies attributes of desired resources and which may be processed by a search engine.

Search Results. A list of resource references generated by a search engine in response to a search query.

Task-Oriented User Activity System

Figure 1:
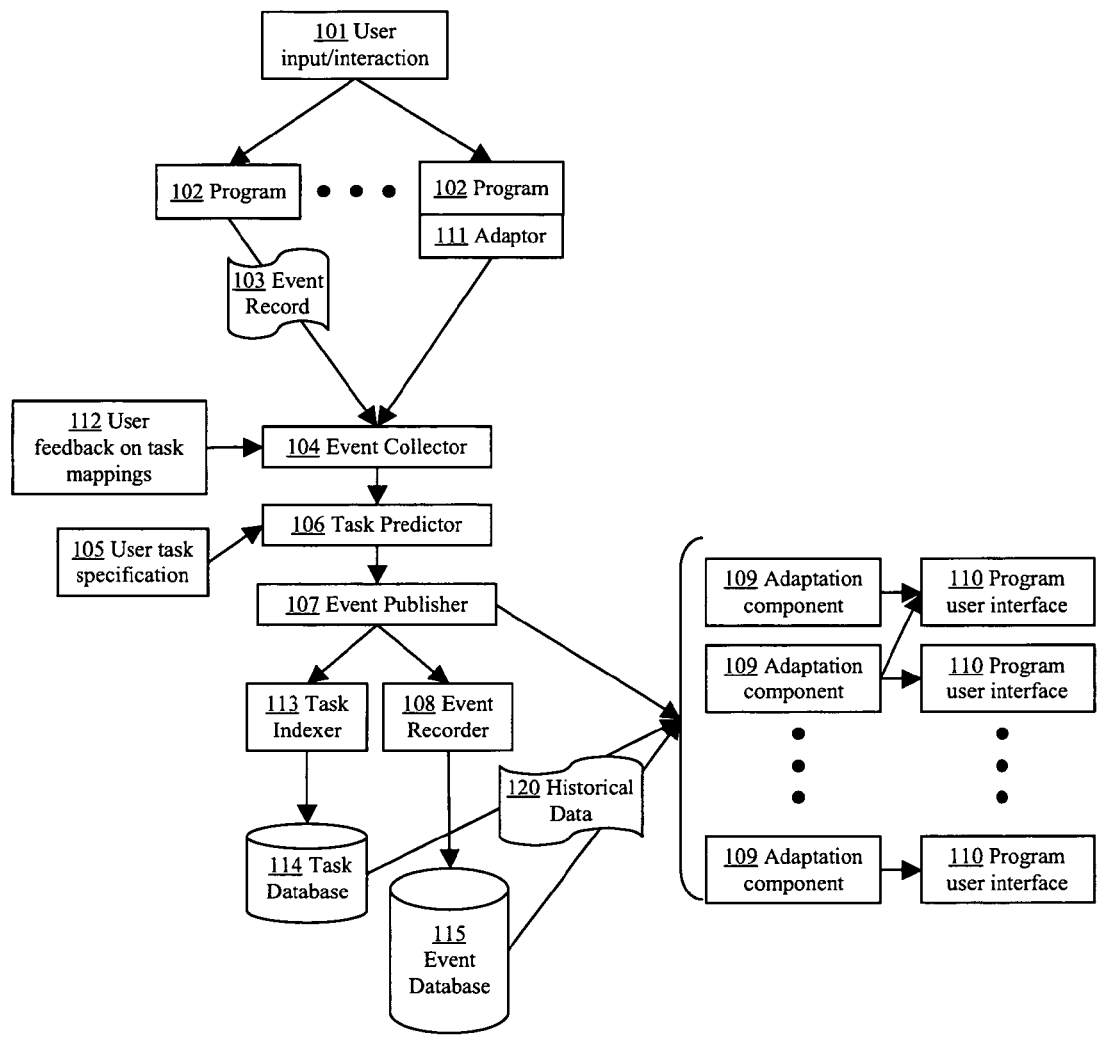
FIG. 1 is a block diagram of a task-oriented user activity system which may be used as part of (or in coordinate with) various embodiments of the present invention.

Preferred embodiments of the present invention operate in cooperation with a task-oriented user activity system. Details of a task-oriented user activity system are illustrated in FIG. 1, and are described in greater detail in US patent application publication 20070162907. The user interacts with a computer interface to generate user input 101 received by software application programs 102 which forward event records such as event record 103 to an event collector 104. An adaptor component 111 may assist in the generation and forwarding of the event records. The event collector 104 communicates event records to the task predictor 106, which then applies machine learning algorithms to predict the current task that each event is associated with. Each event record may then be associated with a task. In addition, a current task being performed may be predicted. At any point in time, the user can specify what task they are working on through a computer interface to generate a user task specification 105. They may also specify metadata about that task. This specification becomes evidence for the task predictor 106, which associates event records with tasks to produce labeled events. The labeled events are then sent to the event publisher 107 which publishes them to various components, including the event recorder 108, the task indexer 113, and one or more adaptation components 109. The event recorder 108 writes the labeled event records to an event history database 115, which is then accessible by components such as the adaptation components 109. The task indexer 113 updates the task database 114 with the labeled event records. The task database maintains the current beliefs of the system regarding what resources are associated with which tasks, and possibly which events are associated with which tasks. It may also maintain statistics about each task, such as the last time that a task was accessed or the number of times that a task has been accessed in the recent past. Adaptation components 109 receive task-labeled event records from the event publisher 107 and, in response to the events, adapt one or more software program user interfaces 110 in a manner that is appropriate for the task associated with the most recent event or events. User interfaces 110 will typically correspond to programs 102 that the user is interacting with. The adaptation components can also access the historical data 120 including past events from the event database 115 and the current set of beliefs about what events and resources are associated with which tasks, stored in the task database 114.

The user can also view the mappings of events and resources to tasks, and can provide feedback 112 on those mappings, indicating that one or more events or resources do not belong in a task, moving one or more events or resources from one task to another, or indicating that one or more resources should be added to a task. This feedback is communicated to the event collector 104. Those event records propagate like all other event records to the task indexer 113 and the event recorder 114. The task indexer corrects its task database 114 in response to the user feedback.

Post-Processing Search Results

Figure 2:
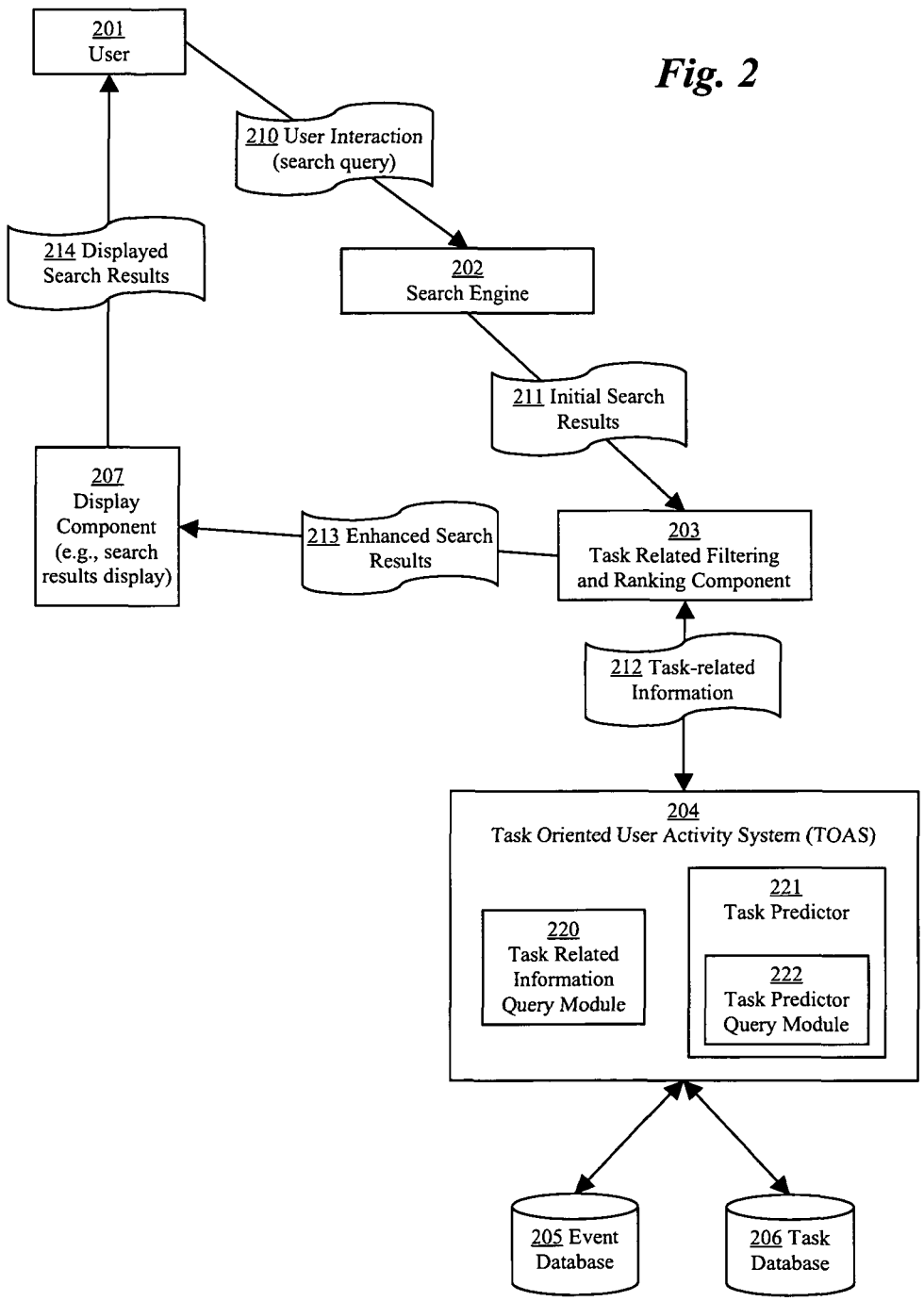
FIG. 2 is a block diagram illustrating a system and method that uses task-related information to enhance search results provided by a search engine.

FIG. 2 is a block diagram of a system for implementing a method of post-processing results from a search engine using task-related information to produce enhanced search results.

A user 201 interacts with a search engine 202 by submitting a search query 210 specifying attributes of a set of resources, usually by supplying a keyword query. The interaction between the user and the search engine is not constrained to any particular interface or mechanism, but typically takes the form of the user interacting with a web browser, which then submits the query to the search engine via the internet. In the case of desktop search, the interaction may take the form of the user interacting with a desktop search application. Note that a Task-Oriented User Activity System (TOAS) 204 running on the user computer obtains event records resulting from the user interaction with the web browser and then predicts a current task of the user. This prediction will be based in part on the search query terms contained in the event record of the search submission as well as other evidence such as the metadata and content of documents recently visited. In response to the search query 210, the search engine 202 generates initial search results 211 which generally include a list of references to resources that match the search query. Before the initial search results are displayed to the user, they are sent to and processed by the Task Related Filtering and Ranking component 203. The Task Related Filtering and Ranking component queries a Task Predictor Query Module 222, which is an extension of the Task Predictor 221 subcomponent of the Task Oriented Activity System (TOAS) 204. In response to the task query, module 222 returns task-related information 212 which includes a list of the most likely tasks and the associated probability that the user is currently in the context of each of those tasks. The number of tasks returned can be customized, but is preferably between 1 and 5, inclusive. After receiving a list of the most probable tasks, the Task Related Filtering and Ranking component 203 then queries a Task-Related Information Query Module 220, which returns additional task-related information 212 that includes, for each specified task what kinds of content the user might be interested in if they are working in the context of that task. This information includes, but is not limited to:

What resources are associated with each of the specified tasks (resources generally become associated with a task when the user uses a resource in the context of a task, but resources can also be manually associated with a task by the user);

How recently those resources have been used while working on those tasks;

How frequently those resources have been used while working on those tasks;

Whether resource(s) were the targets/sources of dataflows from/to a resource related to the specified task;

Whether a resource was accessed within a window of time relative to the specified task.

The Task-Related Information Query Module 220 retrieves or computes this information from two databases—the Event Database 205 and the Task Database 206.

The Task-Related Information Query Module 220 can also produce when requested:

Activity history across projects—records of all activity between a user and resources.

In some embodiments, the Task Related Filtering and Ranking component 203 also queries module 220 to get a recent activity history independent of tasks.

The Task Related Filtering and Ranking component 203 builds a statistical representation of the user's information need at the time of the query. This representation of the user's information need will be more precise than just the query keywords issued to the search engine.

In one embodiment, the Task Related Filtering and Ranking Component 203 filters out from the initial search results references to resources that are not likely to be associated with the user's current task to produce enhanced search results 213. These enhanced search results are then passed to the display component 207 which presents the task-aware search result references 214 to the user 201. The display component 207 may be a web page (similar to traditional web search results), or it may be a list within a desktop application.

In another embodiment, references to resources not likely to be associated with the current task are filtered out, and then the remaining search result references are ranked so that resources that have the highest relevance to the current task are adjusted upward in the rankings. In another embodiment, references to resources not likely to be associated with the current task are moved to the bottom of the search results list, and may be identified by highlighting or other visual indications of reduced relevance.

In order to rank and filter the search results 211, each reference included in the search results 211 is processed by the filtering and ranking component 203 to determine its relationship to the user's likely current task(s). In a preferred embodiment, one way to determine this relationship is for the Task Related Filtering and Ranking component 203 to construct and maintain a list of keywords describing each of the user's tasks. Then similarity metrics such as Term Frequency Inverse Document Frequency (TFIDF) can be applied to assess the similarity between the words associated with the search result and the words associated with the user's current task, producing a likelihood that the result is associated with the task. The words associated with a search result may be derived, for example, by extracting keywords from the resource referenced by the search result and/or from metadata associated with the resource. The words associated with the task may be derived, for example, by combining term frequency vectors extracted from all of the resources associated with the task. This extraction can exploit the fact that the TOAS already learns and maintains a classifier that attempts to predict which tasks are associated with each resource accessed by the user. This classifier can incorporate evidence such as the resource title, resource contents, resource keywords, resource metadata (e.g., resource size, date modified, language, domain name, URL, pathname, enclosing folder, author, revision history), and resource access history (e.g., when the user has previously accessed the resource while working on the current task or on other tasks, total time spent by the user accessing the resource while working on this task and on other tasks, etc.). Hence, in the preferred embodiment, this classifier computes, for each resource, words associated with the task.

At any given point in time, the TOAS 204 may be uncertain about which task the user is currently working on. Persons skilled in the art will note that the TOAS can represent this uncertainty in various ways, e.g., such as a probability distribution P(task) over the set of tasks or as a ranked list. The methods described in the previous paragraph can be extended to deal with this uncertainty by computing a weighted combination of the predicted strength of association between each query result and each of the tasks, producing a likelihood that the result is associated with the user's most probable tasks.

TOAS-Aware Indexer

Figure 3:
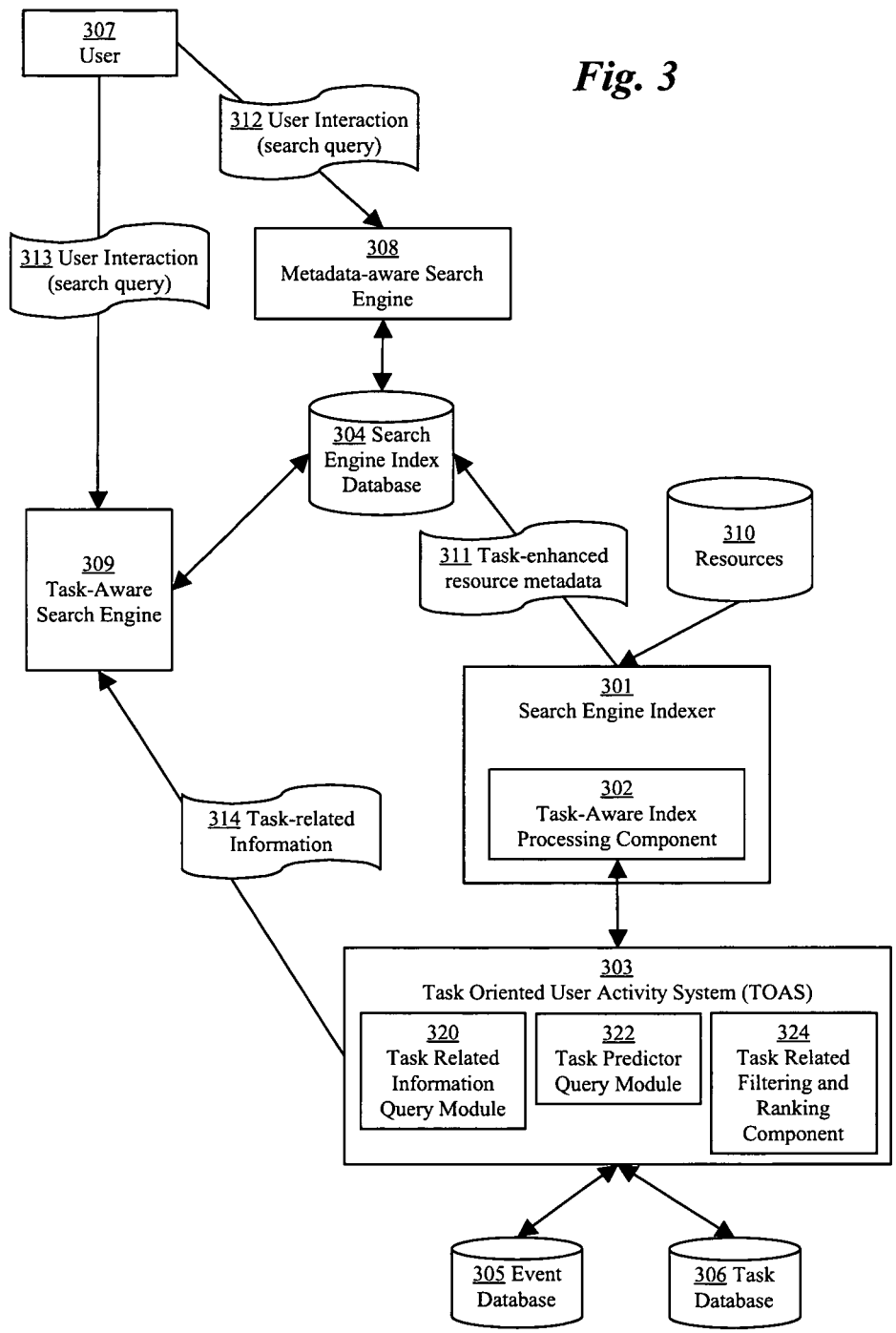
FIG. 3 is a block diagram illustrating a system and method in which a search engine indexer creates a search engine index including task-related information, and a search engine uses this index to provide task-related search results.

FIG. 3 is a block diagram of a system for implementing a method of generating a search index that includes task-related information and delivering task-related search results using the index. In this system, a search engine indexer 301 includes a Task-Aware Index Processing Component 302 which allows it to incorporate task-related information. For each of the resources 310 processed by the indexer 301, the component 302 queries TOAS 303 extended with the Task-Related Information Query Module 320 and Task Predictor Query Module 322 to determine which tasks (if any) the resource is likely to be associated with. The resources known to the TOAS are previously tagged with tasks by the TOAS based on the contents of the Events Database 305 and the Task Database 306. If the resource is unknown to the TOAS, then the Task Related Filtering and Ranking component 324 can attempt to associate the resource with known tasks using association techniques described above in relation to FIG. 2. The list of tasks associated with a resource is then stored by indexer 301 as part of the task-enhanced resource metadata 311 within the Search Engine Index Database 304. This allows a metadata-aware search engine 308 to support search queries 312 from the user 307 that contain task-related metadata search criteria.

A metadata-aware search engine is a search engine that is able to parse and process search queries containing metadata criteria, and return search results that take into account such criteria. These criteria may include metadata properties that do not have to be defined at the time that the software component is released. Task-related metadata is one example of a metadata property. In this case, the task associations are stored in the search engine index 304 as a particular type of metadata 311 associated with the resources. The Task Aware Index Processing Component 302 may also, or alternatively, create a separate index data structure that allows rapid identification of those resources that have a certain task or set of tasks associated with them. One skilled in the art would be aware of data structures appropriate for rapidly locating a set of resources given a set of tasks they are associated with. One example of such a data structure would be a hash-table, with the keys being the task identifiers and the values being the list of resources with associated with the identified task.

An alternative to the Metadata-aware Search Engine is a Task-Aware Search Engine component 309. This is a search engine that receives a search query 313 from a user and queries TOAS 303 extended with the Task-Related Information Query Module 320 and the Task Predictor Query Module 322 to determine the most likely tasks that the user is currently working on 314. The Task-Aware Search Engine 309 retrieves a set of search results using index 304 and generates a set of search results that are most likely to be relevant to the user's most likely current task, using an algorithm for ranking such as described previously in relation to FIG. 2.

Index Post-Processor

Figure 4:
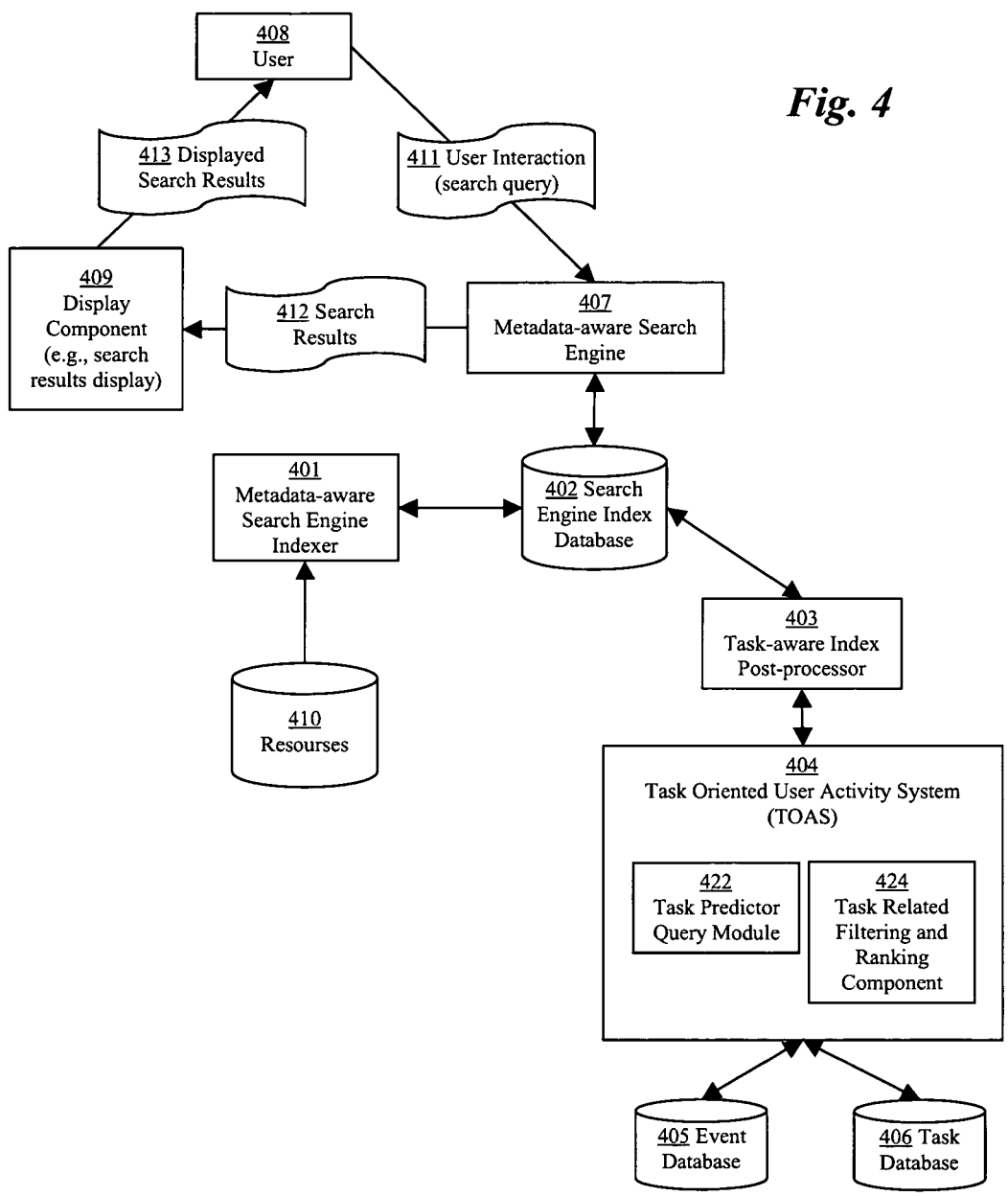
FIG. 4 is a block diagram illustrating a system and method in which an existing search engine index is enhanced to include task-related information.

FIG. 4 is a block diagram of a system for implementing a method of enhancing a search index generated by a traditional search engine indexer to include task-related metadata information, and delivering task-related search results using the enhanced search index. The traditional metadata-aware search engine indexer 401 is a search engine indexer component that creates a search index database 402 of resources 410. The search engine indexer 401 is metadata-aware because it creates index data structures that can include metadata about resources 410. Furthermore, the metadata-aware indexer 401 may also be able to create index data structures that are optimized to allow for fast searching for resources that have a given metadata value or one of a set of metadata values. The Task-Aware Index Post-Processor 403 reads index 402 created by the indexer 401 and post-processes it. In particular, for every resource referenced in the index 402, the Task-Aware Index Postprocessor 403 queries the Task Oriented Activity System (TOAS) 404 extended with the Task Predictor Query Module 422 to determine the set of tasks (if any) that are likely to be associated with that resource. If the resource is unknown to the TOAS, then the Task Related Filtering and Ranking component 424 can attempt to associate the resource with known tasks using association techniques described above in relation to FIG. 2. The indices are then modified to include metadata that specifies the relationship between the resource and the associated tasks. Once the index 402 has been post-processed, the Metadata-aware Search Engine 407 can accept from the User 408 search queries 411 that contain metadata search criteria and use the Index 402 to produce search results 412 containing a set of matching resource references. Search Engine 407 may also rank the references and sort the list of results 412 by rank. The results 412 are sent to a Search Results Display Component 409, which renders them as displayed results 413 onto a display that the user 408 can access.

Over time, as more user interaction events are observed, the TOAS may change its beliefs about which resources are associated with which tasks. As a result, the Task-Aware Index Post-Processor 403 needs to periodically run in order to update the index 402. In a preferred embodiment, there is a configuration file that is used to configure when the Task-Aware Index Post-Processor runs. In one embodiment, The Task-Aware Index Post-Processor can be configured to run on a periodic schedule (every night at 2 AM, every 2 hours, etc.), when there are resources whose metadata needs to be updated (i.e., when the TOAS's belief about project-resource association changes), or when the computer is idle, or some combination.

Direct Resource Metadata Annotation

Figure 5:
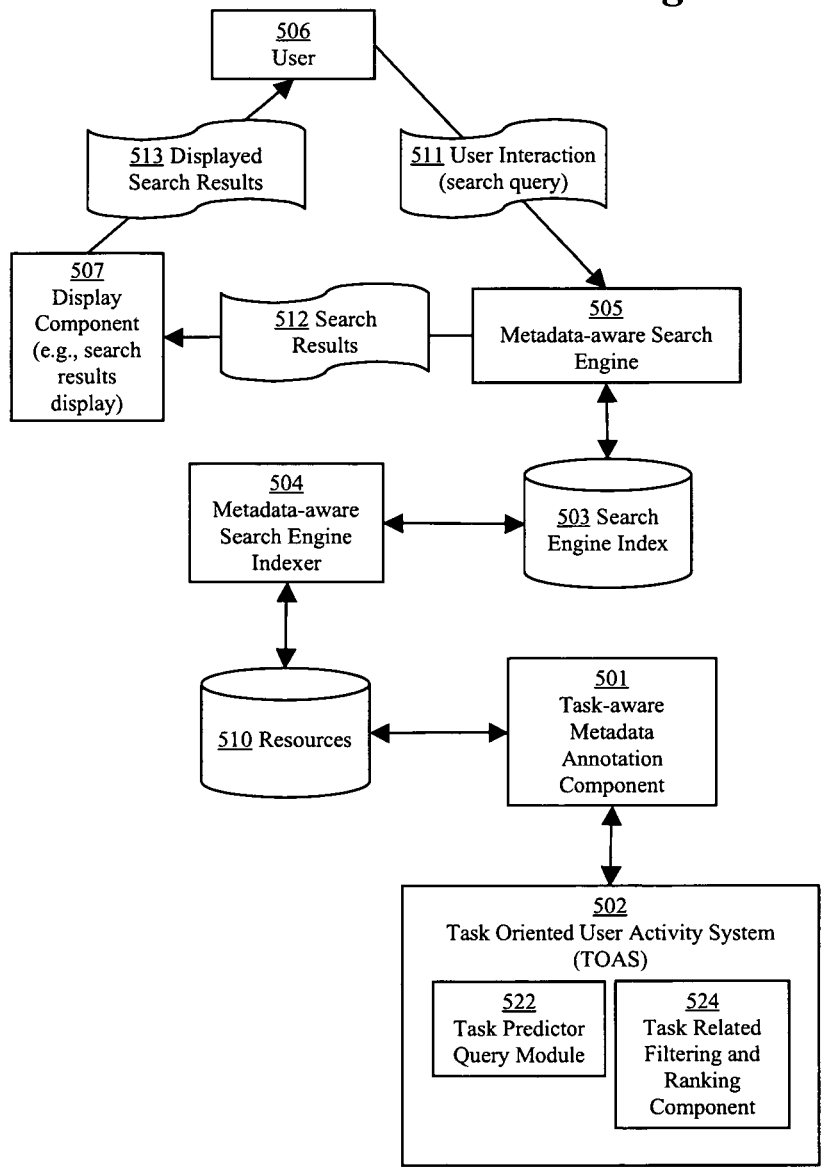
FIG. 5 is a block diagram illustrating a system and method in which resources are enhanced with task-related information which is subsequently included in a search engine index.

FIG. 5 is a block diagram of a system for implementing a method in which task-related metadata is added to resources so that a conventional search indexer can automatically include the task-related metadata into a search index, and a search engine using the index can provide task-related search results. The Task-Aware Metadata Annotation Component 501 directly accesses resources 510 on a storage medium (disk drive, network drive, memory card, etc). The Annotation component 501 extracts information from the resource and passes it to the Task Oriented Activity System (TOAS) 502 extended with the Task Predictor Query Module 522 so that the TOAS can determine which tasks (if any) are associated with that resource. If the resource is unknown to the TOAS, then the Task Related Filtering and Ranking component 524 can attempt to associate the resource with known tasks using association techniques described above in relation to FIG. 2. Information extracted from the resource may include the content of the resource as well as any task-related metadata that is associated with the resource. The information collected from a resource may be different for different types of resources. For example, if the resource is an email message, the information that is collected may include: the title, the sender email address, the recipient email addresses (to, cc, and bcc), the subject, any email thread identifier tag, and the first 1000 bytes from the email message body. This information is passed to the TOAS extended with the Task Predictor Query Module 522, which in return passes back the associated task(s). The Annotation Component 501 then directly annotates the resource by modifying the resources 510 stored on the storage medium. The annotation is preferably performed in the way supported and recognized by the underlying storage mechanism and the Search Engine Indexer 504. For example, in one embodiment, the list of associated tasks is stored as a custom Microsoft Windows NTFS file system metadata attribute. The Metadata-aware Search Engine Indexer 504 reads these task metadata tags when it indexes the resources 510. The Indexer 504 then includes those metadata tags into its index 503, and may also create a new index—a data structure that will optimize the speed of requesting a set of resources that are associated with a set of tasks. The Metadata-aware Search Engine 505 accepts search queries 511 from the User 506, and uses the index 503 to produce search results 512 containing a set of matching resource references. The Search Engine 505 may also rank the results 512. The results 512 are sent to a Search Results Display Component 507, which renders them as displayed results 513 onto a display that the user 506 can access.

Query Language Extensions

Figure 6:
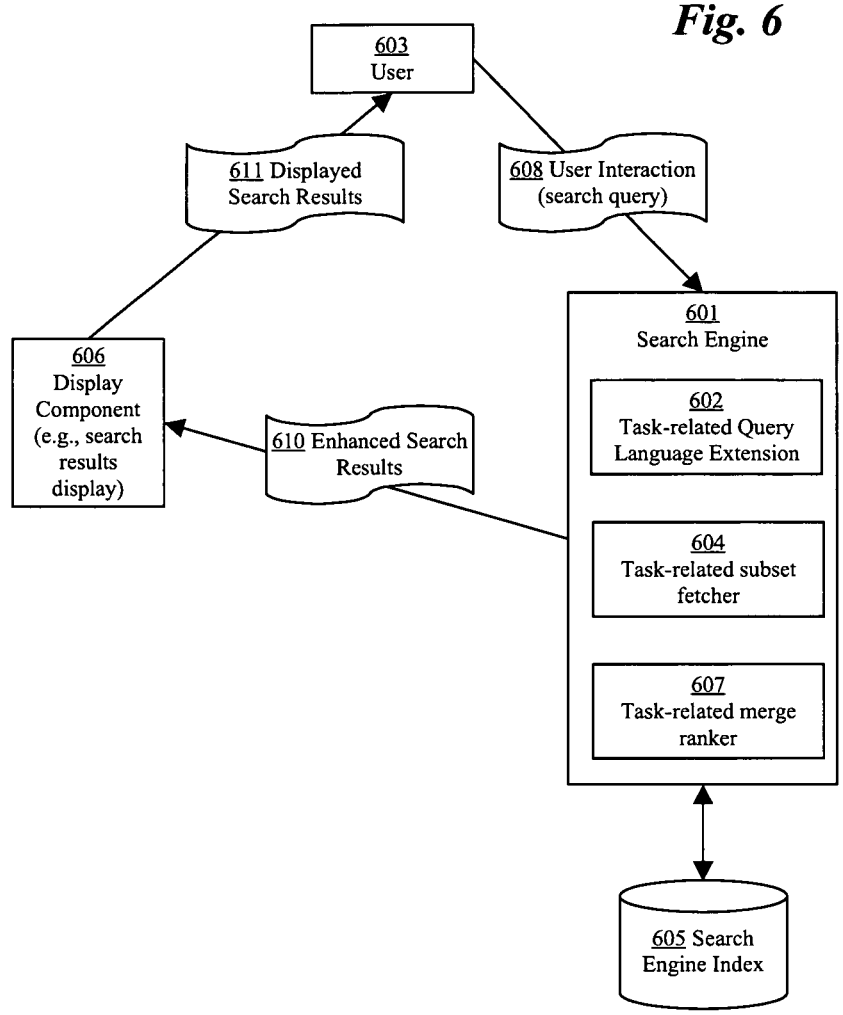
FIG. 6 is a block diagram illustrating a system and method in which a search engine accepts and executes queries including task-related search criteria.

FIG. 6 is a block diagram of a system for implementing a method of delivering task-related search results in response to user search queries that include task-related search criteria. A traditional search query language supports specification of keywords and metadata criteria. The user 603 employs the query language to formulate a search query 608 specifying criteria that desired resources should satisfy. If keywords are specified, then the resources referenced in the search results preferably or should contain those keywords. Metadata criteria are used to specify that the metadata of the resources referenced in the search results should match the specified metadata criteria. Examples of metadata that are commonly supported by current search engine technology include modification date, language, has-a-hyperlink-to, Is-liked-from, and is-part-of-domain. According to one embodiment of the invention, an enhanced search engine 601 supports task-oriented query language extensions using a Task-Oriented Query Parser 602. A search query submitted by the user 603 is examined by Parser 602 to identify search query terms that use task-oriented query language extensions. These extensions to the query language allow the user to specify additional desired characteristics of the search results. The task-oriented extensions to the query language allow the Parser 602 to process resource criteria including (but not limited to):

Task. The task(s) with which a resource is associated or likely to be associated Time of access. When a resource was created, last accessed, or last modified by the user while on the current task or on a specific task Frequency of use. How frequently the user has used a resource while on the current task or on a specific task Dataflow: Other resource(s) that were the targets/sources of dataflows from/to a resource Pattern of access. Whether a resource was accessed within a window of time relative to an access time of another resource.

Each of these extensions has an corresponding query syntax, such as "task:<taskname>" for specifying the task that search results should be associated with. More generally, each search query criteria syntax preferably has a unique prefix followed by a colon (such as "task:", "access-time:", "access-count:", "dataflow-to:" followed by the parameters from the user). The Task-oriented Query Parser may use a simple prefix lookup table to determine which task-specific query criterion is being invoked. Once specific criteria have been determined, the list of task-oriented query criteria are passed to the Task-Oriented Subset Fetcher 604, which consults the search engine index 605 to return a set of search results referencing resources that match the task-oriented criteria specified in the search query. A Task-Oriented Merge Ranker 607 then merges (by unions, intersections, or more complex Boolean operations) the sets that match the task-oriented search query criteria with the set of results produced by the traditional search engine component to produce a set of enhanced search results 610. The Search Results Display component 606 then presents the displayed search results 611 to the user 603.

Query Language Pre-Processing—Focusing Results on Probable Current Tasks

In some cases, it may not be practical to add a new component within an existing search engine or to influence the indexing, such as when the search engine and its indexing methods are proprietary and nonpublic. One aspect of the invention provides a method for automatically transforming and/or expanding user-supplied search queries using task-related information and submitting the enhanced search query to a conventional search engine.

Figure 7:
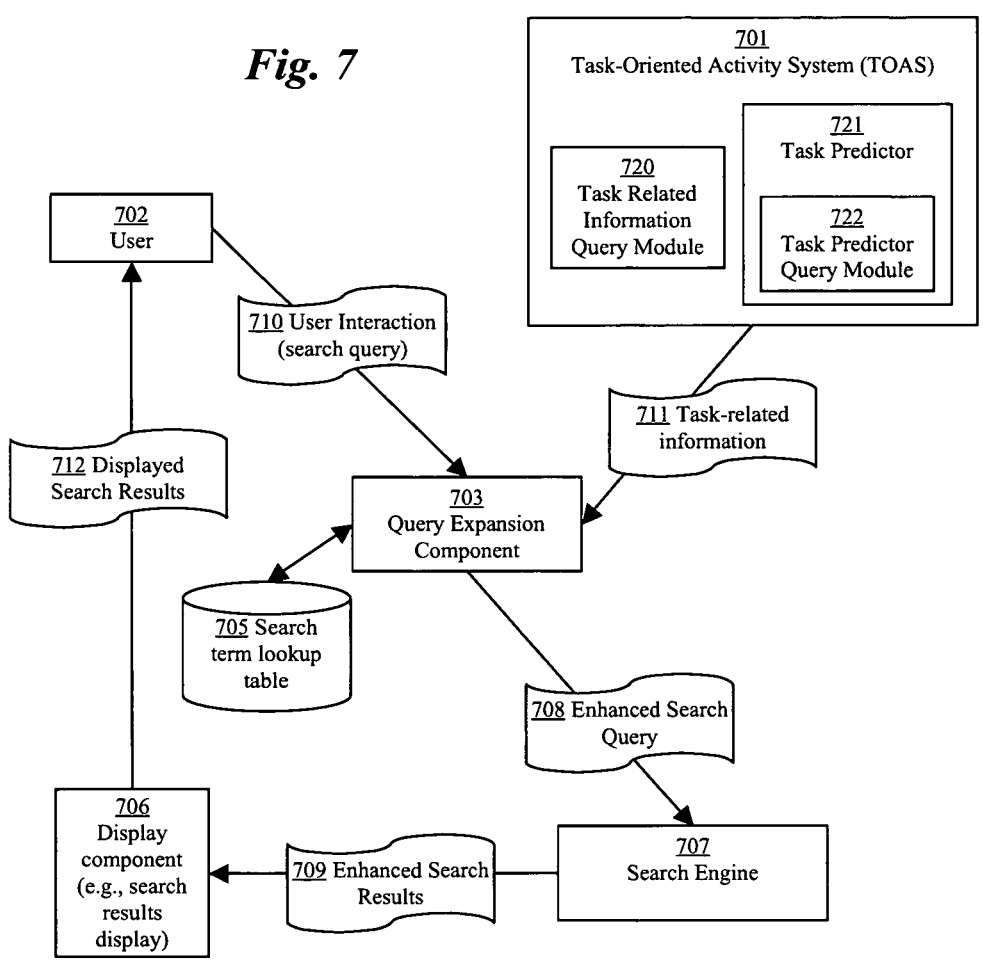
FIG. 7 is a block diagram illustrating a system and method in which a search engine automatically expands a search query using task-related information and forwards an enhanced search query to a search engine.

In one embodiment shown in FIG. 7, a Task Oriented Activity System (TOAS) 701 is extended with a Task Predictor Query Module 722. A function of the Task Predictor Query Module 722 is to take as inputs lists of tasks, and return as output task-related information 711, which includes a list of features that are likely to be predictive of the input tasks. Features generally include but are not limited to words (e.g., "information", "extraction") and metadata restrictions (e.g., "title must contain the word 'information retrieval'"). The Task Predictor Query Module 722 is an extension of one of the subcomponents of the TOAS 701 called the Task Predictor 721, which uses machine learning to learn statistical models mapping evidence to tasks. The Task Predictor Query Module 722 examines the models learned by the Task Predictor 721, and for each input task outputs the features that are most likely to be predictive of that task.

A search query 710 generated by the user 702 is processed by a Query Expansion Component 703 which queries the Task Predictor Query Module 722 of a TOAS 701 to obtain task-related information 711 for the most likely tasks.

The Query Expansion Component 703 uses a lookup table stored in a database 705 to map features to search engine query terms and filter out features that are not supported by the Search Engine 707. The lookup table allows the Query Expansion Component 703 to support multiple search engines that have varying search query language formats (e.g., Yahoo!, Google, etc.). In most cases, simple key words will not need to be transformed, but metadata criteria are often implemented with different syntax by different search engines. Query expansion component 703 produces and sends an enhanced search query 708 including features that have not bee filtered out to a conventional search engine 707, which produces search results 709. A Search Results Display component 706 receives the results 709 and presents displayed search results 712 to the user 702.

Query Language Preprocessing with Query Language Extensions

FIG. 8 is a block diagram of a system for implementing a method of processing task-related search criteria and delivering task-related search results. According to this method, a search query 810 composed in an enhanced search query language is translated into a traditional search engine language, typically by supplementing the search query with additional query terms. The Task-Oriented Query Processor 801 receives a search query from interaction with user 802 and performs similar actions as the Task Oriented Query Language Extension 602, but in a more limited way. Specifically, Processor 801 only recognizes one kind of additional metadata—specification of tasks. This allows the user 802 to specify an extended search term that indicates a task-related search criterion. The Query Expansion Component 803 performs similar actions as the Query Expansion Component 703 with one exception: if the user specifies one our more tasks as part of the extended search query 810, then the query expansion component 803 issues a query to the TOAS 804 extended with the Task Predictor Query Module 822 specifying those tasks, and the TOAS returns features 805 likely to be predictive of those specified tasks rather than the user's current task. In another embodiment, the Query Expansion Component 803 can request from the TOAS 804 extended with the Task Predictor Query Module 822 features likely to be predictive of both the specified task and the user's current task. Otherwise, the operation is similar to the embodiment discussed above in relation to FIG. 7. Expansion Component 803 uses lookup table 806 to map features 805 to search terms and produce an enhanced search query 807 which is submitted to search engine 808. Search results 809 are then received by display component 811 and presented to user 802 as displayed search results 812.

The invention claimed is:

1. A computer-implemented method for digital search, the method comprising:
    generating, using a task-related query processor, a search query in an enhanced search query language that includes a task-related search term, the task-related search term being related to a current task being performed by a user;
    predicting a predicted task based on the task-related search term and stored event records that correspond to an activity history of the user and that identify content of documents previously visited by the user, wherein the predicted task is a particular task, from among a plurality of tasks, that is predicted as the current task being performed by the user according to a probability determination and using the stored event records; and
    translating the enhanced search query language into a traditional search engine language by supplementing the search query with additional search terms to generate a supplemented search query, wherein the additional search terms of the supplemented search query are different from the task-related search term and are generated according to task-related features that are representative of the predicted task, wherein the supplemented search query corresponds to the task-related search term and the additional search terms;
    retrieving, from a search engine, search results matching the traditional search engine language corresponding to the supplemented search query; and
    presenting the search results.

2. A computer-implemented method for digital search with a task-enhanced search query, the method comprising:
    generating, using a task-related query processor, a search query based on interaction with a user, wherein the search query is in an enhanced search query language that includes a task-related search term, wherein the task-related search term is related to a current task being performed by the user;
    predicting a predicted task based on the task-related search term and stored event records that correspond to an activity history of the user and that identify content of documents previously visited by the user, wherein the predicted task is a particular task, from among a plurality of tasks, that is predicted as the current task being performed by the user according to a probability determination and using the stored event records; and
    translating the enhanced search query language into a traditional search engine language by supplementing the search query with additional search terms to generate a supplemented search query, wherein the additional search terms of the supplemented search query are different from the task-related search term and are generated according to task-related features that are representative of the predicted task, wherein the supplemented search query corresponds to the task-related search term and the additional search terms;

retrieving, from a search engine, search results matching the traditional search engine language corresponding to the supplemented search query; and presenting the search results to the user.

3. The method of claim 2, wherein generating the search query further includes submitting the predicted current task to a task-oriented activity system to obtain the additional search terms that represent task-related features related to the predicted current task, and processing the search query to include the additional search terms and generate the supplemented search query.

4. The method of claim 3, wherein the processing uses a lookup table to map the features to search terms that are appropriate for a particular search engine.

5. The method of claim 2, wherein the task-related search term includes a task-related metadata criterion specifying the current task, and wherein the search engine is an enhanced search engine supporting task-oriented query language extensions.

6. The method of claim 5, wherein generating the search query comprises mapping the task-related metadata criterion to query terms of the search engine using a lookup table.

7. The method of claim 1, wherein the processing uses a lookup table to map the task-related features to search terms appropriate for a particular search engine.

8. The method of claim 1, wherein the task-related search term includes a task-related metadata criterion specifying the current task, and wherein the search engine is an enhanced search engine supporting task-oriented query language extensions.

9. The method of claim 8, wherein generating the search query includes mapping the task-related metadata criterion to query terms of the search engine using a lookup table.

10. A system for performing a digital search, comprising:
a task-related query processor that:
generates a search query in an enhanced search query language that includes a task-related search term, the task-related search term being related to a current task being performed by the user;
predicts a predicted task based on the task-related search term and stored event records that correspond to an activity history of the user and that identify content of documents previously visited by the user, wherein the predicted task is a particular task, from among a plurality of tasks, that is predicted as the current task being performed by the user according to a probability determination and using the stored event records; and
translates the enhanced search query language into a traditional search engine language by supplementing the search query with additional search terms to generate a supplemented search query, wherein the additional search terms of the supplemented search query are different from the task-related search term and are generated according to task-related features that are representative of the predicted task, wherein the supplemented search query corresponds to the task-related search term and the additional search terms;
a search engine that retrieves search results matching the traditional search engine language corresponding to the supplemented search query; and
display components that present the search results.

11. The system of claim 10, wherein the task-related query processor generates the search query based on interaction with the user.

12. The system of claim 11, wherein the task-related query processor obtains the additional search terms representing features related to the predicted current task from a task-oriented activity system and processes the search query to generate the supplemented search query that includes the additional search terms.

13. The system of claim 10, wherein the task-related query processor uses a lookup table to map the task-related features to search terms appropriate for a particular search engine.

14. The system of claim 10, wherein the task-related search term includes, a task-related metadata criterion specifying the current task, and wherein the search engine is an enhanced search engine supporting task-oriented query language extensions.

15. A system for performing a digital search, comprising:
a task-related query processor that:
generates a search query, wherein the search query is in an enhanced search query language that includes a task-related search term, the task-related search term being related to a current task being performed by the user;
predicts a predicted task based on the task-related search term and stored event records that correspond to an activity history of the user and that identify content of documents previously visited by the user, wherein the predicted task is a particular task, from among a plurality of tasks, that is predicted as the current task being performed by the user according to a probability determination and using the stored event records; and
translates the enhanced search query language into a traditional search engine language by supplementing the search query with additional search terms to generate a supplemented search query, wherein the additional search terms of the supplemented search query are different from the task-related search term and are generated according to the task-related features generated according to task-related features that are representative of the predicted task, wherein the supplemented search query corresponds to the task-related search term and the additional search terms;
a processor for retrieving, from a search engine, search results matching the traditional search engine language corresponding to the supplemented search query; and
a processor for presenting the search results.

16. The system of claim 15, wherein the task-related query processor uses a lookup table to map the task-related features to search terms appropriate for a particular search engine.

17. The system of claim 15, wherein the task-related query processor obtain the additional search terms representing features related to the predicted current task from a task-oriented activity system and processes the search query to generate the supplemented search query that includes the additional search terms.

18. The system of claim 17, wherein the task-related query processor uses a lookup table to map the task-related features to search terms appropriate for a particular search engine.

19. The system of claim 15, wherein the task-related search term includes a task-related metadata criterion specifying the current task, and wherein the search engine is an enhanced search engine supporting task-oriented query language extensions.

20. The system of claim 19, wherein the task-related query processor maps the task-related metadata criterion to query terms of the search engine using a lookup table.

* * * * *